Aug. 15, 1961 G. R. RUSSUM 2,996,183
CONVEYOR FIBER CLEANER
Filed April 23, 1958 2 Sheets-Sheet 1

INVENTOR
GAILLARD R. RUSSUM
BY John A. McKinney
ATTORNEY

Aug. 15, 1961   G. R. RUSSUM   2,996,183
CONVEYOR FIBER CLEANER

Filed April 23, 1958   2 Sheets-Sheet 2

INVENTOR
GAILLARD R. RUSSUM
BY
John R. McKinney
ATTORNEY 2,996,183
Patented Aug. 15, 1961

United States Patent Office

2,996,183
CONVEYOR FIBER CLEANER
Gaillard R. Russum, Somerville, N.J., assignor to Johns-Manville Corporation, New York, N.Y., a corporation of New York
Filed Apr. 23, 1958, Ser. No. 730,351
16 Claims. (Cl. 209—28)

This invention relates to a method and apparatus for the treatment of fibrous material and particularly to the removal of finely divided unwanted particles such as dust from the fibrous material. The method and apparatus is especially suited for use in the cleaning of asbestos fiber to remove unwanted particles, which term is used to include items such as dust, dirt, foreign matter and the like, therefrom and is also intended for use in separating asbestos fibers of various lengths for classification. However, the method and apparatus disclosed herein may be used to air wash or gas wash many other products such as seeds, chemicals, grain, food products and other similar materials.

In the milling of asbestos fibers in the dry state considerable quantities of unwanted particles become intermixed with the fiber. The presence of these unwanted particles renders the asbestos fiber undesirable for many commercial uses, making it highly desirable to produce clean fibers. The removal of the unwanted particles is extremely difficult owing to the relatively fragile nature of the asbestos fiber wherein harsh mechanical handling tends to injure the fibers and reduce their quality and usefulness. Since the value of the asbestos fiber depends upon its length, extreme care must be exercised so as not to shorten the length of the fiber in removing the dust. Also, for successful commercialability, it is necessary that the clean fibers be of specified lengths. The most desired end product is one in which the fiber lengths do not vary appreciably. Therefore, a method and apparatus wherein the asbestos fibers can be cleaned and at the same time classified into specific lengths is the object of highly intensified research.

It is an object of this invention to provide a method and apparatus for the cleaning of fibrous material which avoids the harsh mechanical handling of the fibers.

It is another object of this invention to provide a method and apparatus for the treatment of fibrous material which utilizes a pneumatic system to thoroughly clean the fibrous material.

It is another object of this invention to provide a method and apparatus for the cleaning of fibrous material in which the fibers may be classified into various lengths during the cleaning operation.

Briefly stated, the foregoing objects are accomplished in the instant invention by a plurality of air knives acting on the fibrous material alternately from opposite directions to thoroughly clean, aerify and classify the fibrous material. The above process is carried out essentially within a housing that is connected to a vacuum creating source. A flat endless screen passes through the housing and is mounted for movement over a pair of rollers each of which are supported outside the housing. The first endless screen has a pair of endless foam rubber strips secured to the outer surface of the screen adjacent each edge portion. A plurality of spaced transverse foam rubber strips are secured to the outer surface of the screen so that each transverse strip connects the inner edges of the endless foam rubber strips to form therewith a plurality of compartments. A feed hopper adjacent one end of the upper reach of the first endless screen deposits a measured quantity of the fibrous material having unwanted particles intermixed therewith and clinging thereto into the compartments. A second endless screen extends longitudinally of the housing and cooperates with the first endless screen and foam rubber strips to confine the fibrous material in the compartments between the adjacent reaches of the endless screens during passage through the housing. A plurality of air knives are mounted within the housing and are adapted to direct blasts of air through each of the endless screens. As the fibrous material moves through the housing, the air knives act on the material alternately from opposite directions to free the unwanted particles therefrom and to clean the endless screens. The freed particles pass through the endless screens and are removed through the housing. At the other end of the upper reach of the first endless screen, an aspirator removes the clean fibers.

The invention will be more fully understood and further objects and advantages thereof will become apparent when reference is made to the following detailed description of a preferred embodiment of the invention and the accompanying drawings in which.

Figure 1:
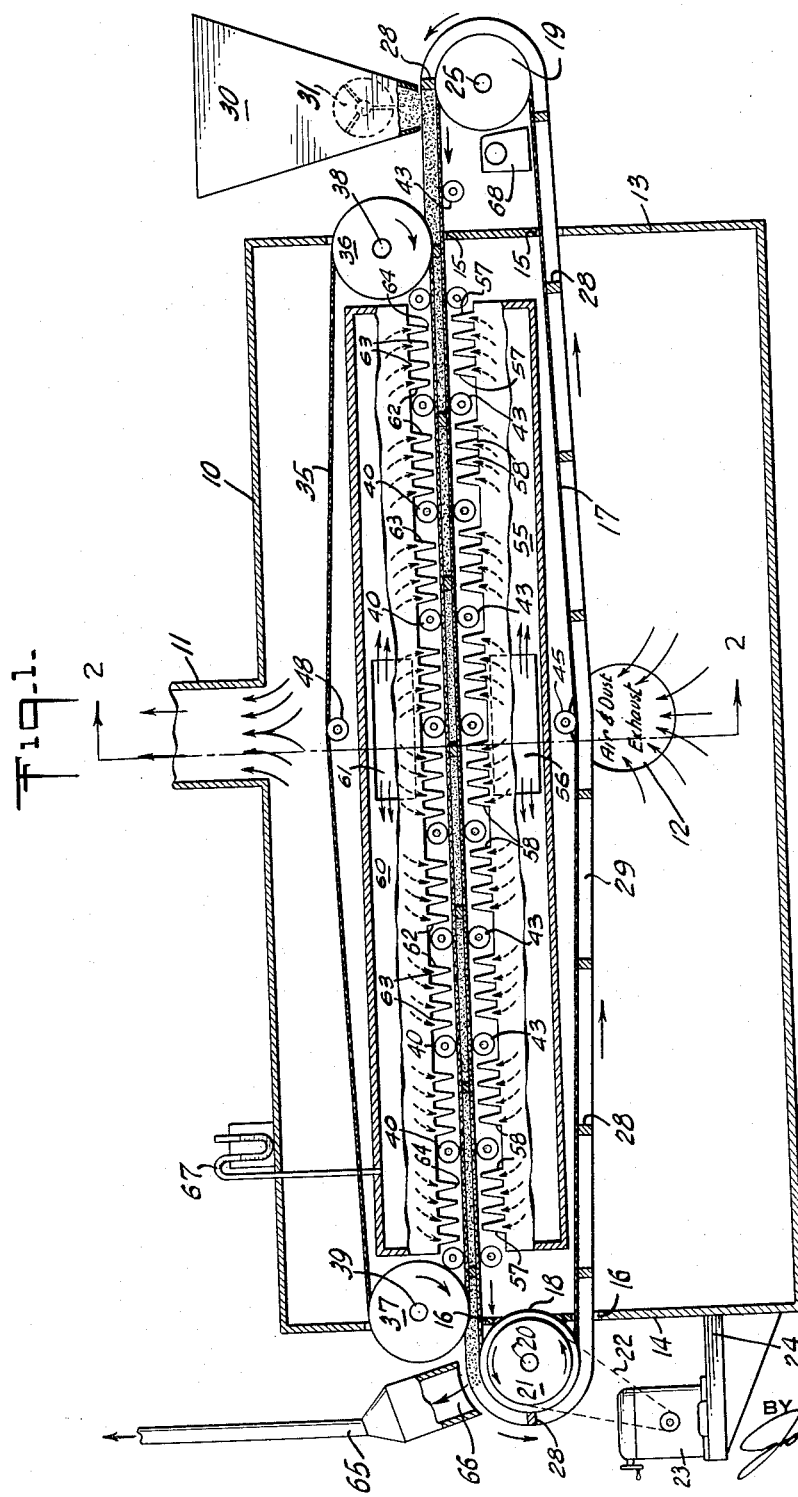
FIG. 1 is a side elevation with parts in section of the apparatus of the instant invention.
Figure 2:
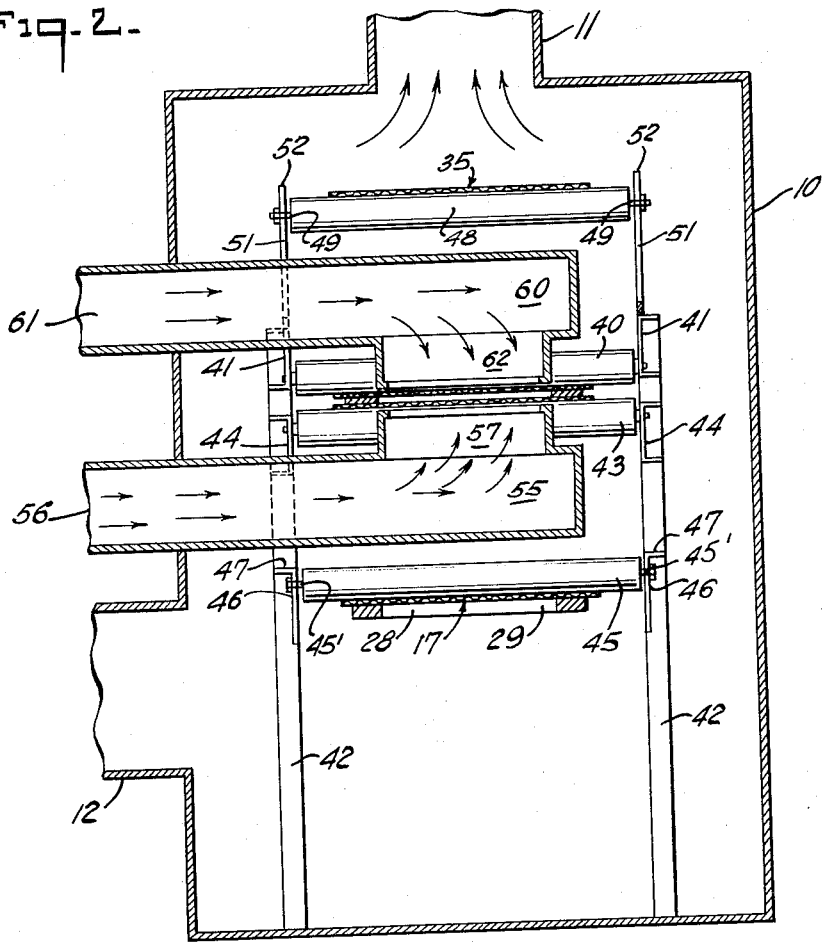
FIG. 2 is a section taken on the plane passing through line 2—2 of FIG. 1.

Referring to the drawing, there is disclosed in FIG. 1, a generally rectangular housing 10 which is connected to a vacuum creating source (not shown) by ducts 11 and 12. Each end wall 13 and 14 of the housing 10 is provided with openings 15 and 16 allowing for passage of an endless screen 17 which is entrained around the rollers 18 and 19. The roller 18 is secured to a shaft 20 journalled for rotation in suitably supported conventional journal boxes. A pulley 21 attached to the end of the shaft 20 and rotating therewith is connected by a drive chain 22 to a source of power 23 mounted on a fixed support 24 to rotate the roller 18. The endless screen 17 is moved by the rotation of the roller 18. The other roller 19, adjacent the end wall 13, is secured to a shaft 25 journalled for rotation in suitably supported conventional journal boxes. Endless foam rubber strips 26 and 27 are secured adjacent each edge portion to the outer surface of the screen 17. A plurality of transverse foam rubber strips 28 secured to the outer surface of the screen 17 join the inner edges of strips 26 and 27 at spaced intervals to form compartments 29 on the outer surface of the screen 17.

A feed hopper 30 is conventionally supported adjacent the end wall 13 and above one end of the upper reach of the endless screen 17. The material to be acted upon is stored in the hopper 30. A rotary valve 31 in the hopper 30 allows a measured amount of the fibrous material having unwanted particles intermixed therewith and clinging there to be deposited on the upper reach of the endless screen 17 within the compartments 29.

A second endless screen 35 is entrained around the rollers 36 and 37 for movement within the housing 10. The endless screen 35 extends longitudinally of the housing 10 and is adjacent and parallel to the upper reach of the endless screen 17. The lower reach of the endless screen 35 is spaced from the upper reach of the endless screen 17 a predetermined distance so as to contact and compress slightly the free upper surfaces of the foam rubber strips 26, 27 and 28. The rollers 36 and 37 are secured to shafts 38 and 39 which are journalled for rotation in suitably supported conventional journal boxes. The endless screen 35 is moved by frictional engagement with the foam rubber strips 26, 27 and 28.

Within the housing 10, the lower reach of the endless screen 35 is maintained substantially in one plane by bearing against a series of rollers 40, the shafts of which are journalled for rotation in longitudinally extending fixed angle bars 41 supported on legs 42. The angle bars 41 are mounted for vertical adjustment to vary the predetermined distance between the adjacent reaches of the endless screens. The upper reach of the endless screen 17 is maintained substantially in one plane by bearing against a series of rollers 43, the shafts of which are journalled for rotation in longitudinally extending fixed angle bars 44 supported on the legs 42. The roller 36 is so mounted to compress the foam rubber strips 26, 27 and 28 to a predetermined distance apart as the endless screen 17 together with the strips 26, 27 and 28 pass under the roller 38. The rollers 40 and 43 cooperate to maintain the adjacent reaches of the endless screens 17 and 35 at this predetermined distance apart as the endless screens pass longitudinally through the housing 10. As indicated on the left side of FIG. 1, as the lower reach passes from beneath the roll 37, the foam rubber strips 26, 27 and 28 return to their normal thickness. During passage through the housing, the foam rubber strips 26, 27 and 28 resiliently urge the belts 17 and 35 against the rollers 43 and 40 respectively to maintain the belts at the predetermined distance apart. Thus, the foam rubber strips 26, 27 and 28 cooperate with the endless screens 17 and 35 to form an air seal for the compartments 29 between the adjacent reaches of the endless screens.

The endless screen 17 is guided for movement over its associated rolls 18 and 19 by an adjustably mounted guide and tensioning roll 45 which is rotatably mounted on a shaft 45¹. Each end of the shaft 45¹ is mounted for vertical adjustment in a slot 46 in the brackets 47 supported by the legs 42. Similarly, the endless screen 35 is guided over its associaed rolls 36 and 37 by a guide and tensioning roller 48 which is rotatably mounted on the shaft 49. Each end of the shaft 49 is mounted for vertical adjustment in a slot 51 in the brackets 52 supported by the bars 41.

Figure 4:
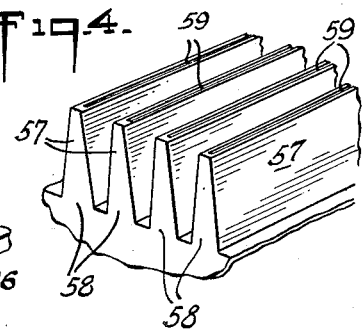
FIG. 4 is a pictorial representation of a part of some of the air knives.
Figure 3:
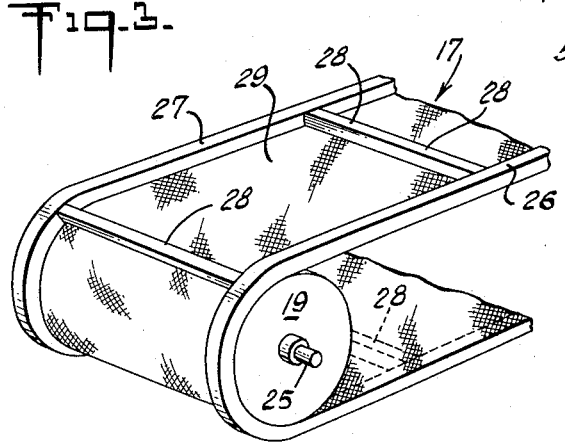
FIG. 3 is a pictorial representation of part of the lower conveyor belt.

Mounted in fixed position within the housing 10 and located between the upper and lower reaches of the endless screen 17 is a header 55 which is connected by a duct 56 to a blower (not shown) supplying variably controlled pressurized air. Protruding from the upper surface of the header 55 are a plurality of air knives 57. If desired, the air knives 57 may consist of a slotted block, as shown, a plurality of jets or a plurality of nozzles. As shown in FIG. 1, these air knives 57 are arranged in groups of four spaced a predetermined distance apart. Each group of air knives 57 is positioned between adjacent rollers 43. Each air knife 57, as viewed in FIG. 4, is substantially triangularly shaped in cross section with a base portion 58 opening into the header 55. Each air knive 57 gradually tapers toward its apex portion to an upper edge having a reduced slot 59. The slot 59 of each air knife 57 is positioned just beneath the upper reach of the endless screen 17 and directs a flow of pressurized air upwardly through the endless screen 17.

Another header 60 is secured in position within the housing 10 between the upper and lower reaches of the endless screen 35. Duct 61 connects the header 60 to a blower supplying variably controlled pressurized air (not shown). Protruding from the lower surface of the header 60 are a plurality of air knives 62. As shown in FIG. 1 the air knives 62 are in groups of four with each group positioned between adjacent rollers 40. Each knife 62 is similar to each air knife 57 and has an opening 63 leading into the header 60 and then the opening gradually tapers to a reduced slot 64 which is positioned adjacent the lower reach of the endless screen 35 and directs a flow of pressurized air downwardly through the endless screen 35.

The longitudinal axes of the air knives 57 and 62 are generally parallel to each other and perpendicular to the direction of movement of the endless screens 17 and 35. The slots 59 and 64 extend approximately the full distance between the inner edges of the foam rubber strips 26 and 27. The groups of air knives 57 and 62 have staggered centers so that a vertical plane passing through one of the air knives 57 would pass approximately through the mid point of the distance between adjacent air knives 62. In view of the staggered relationship of the air knives 57 and 62, the fibrous material in the compartment 29 will be alternately subjected to the blast issuing from the air knives 57 and 62 during passage through the housing 10.

An aspirator 65 is mounted by conventional supports (not shown) adjacent the end wall 14. The inlet opening 66 of the aspirator is positioned directly above the upper reach of the endless screen 17 as it passes around the roller 18 so that the clean fibers are drawn up through the aspirator 65. Also, a manometer 67 is connected to the header 60 for ascertaining the operating pressure therein. A suction box 68, mounted adjacent the roll 19 and above the lower reach of the screen 17, cleans the inner surface of the endless screen 17.

In operation, the endless screens 17 and 35 are put into motion and the various blowers started. Fibrous material having unwanted particles intermixed therewith and clinging thereto is deposited in measured quantities from the hopper 30 into the compartments 29 on the upper reach of the endless screen 17. As the endless screen 17 passes beneath the roller 36, the foam rubber strips 26, 27 and 28 are compressed. The endless screen 35 under the restraining action of the rollers 40 thereafter cooperates with the endless screen 17 under the restraining action of the rollers 43 and the foam rubber strips 26, 27 and 28 to confine the fibrous material within the compartments 29. The endless screen 35 is moved by the endless screen 17 through the frictional contact with the foam rubber strips. As the fibrous material reaches the first air knife 57, it is acted upon by the blast emanating therefrom. The fibrous material is lifted from the endless screen 17 by the air from the knife 57 and pushed against the screen 35. This action frees a portion of the unwanted particles in the fibrous material which is then held against the screen 35 by the vacuum in the housing 10 while the unwanted particles that have passed through the screen 35 are removed through the housing 10 and exhaust ducts 11 and 12. As the fibrous material on the endless screen 35 then reaches the first air knife 62, it is acted upon by the blast emanating therefrom and pushed off the endless screen 35 downwardly against the endless screen 17. More unwanted particles are thereby freed by this action of the fibrous material and passed through the endless screen 17. Each air knife 57 and 62 acts to clean the outside of the associated endless screen 17 or 35 and to propel the fibrous material against the other endless screen 17 or 35. The above process is constantly repeated by the air knives 57 and 62 as the material moves through the housing 10. The fibrous material is moved first against one endless screen and then against the other. This repeated agitation alternately from opposite directions frees substantially all of the unwanted particles in the fibrous material. These unwanted particles pass through the endless screen 17 and 35 and are removed by the housing 10 and exhaust ducts 11 and 12. As the cleaned fibrous material in each compartment 29 passes over the roller 18, it is removed by the aspirator 65 to be collected at a convenient location.

The motion of the fibrous material within the compartment 29 is not limited to the direct movement caused by the air knives 57 and 62. The repeated agitations alternately from opposite sides cause the fibrous material to be subjected to a tumbling, turbulent action wherein each individual fiber is set into motion to free unwanted particles therefrom by its own motion and its contact with other fibers and the endless screens 17 and 35. This tumbling, turbulent action is such that most probably each individual fiber will contact the endless screens 17 and 35 at least once during passage through the housing 10. The net result is that during the passage through the housing 10, the fibrous material is so thoroughly agitated that substantially all the unwanted particles are freed therefrom and are removed after passing through the endless screens by the housing 10 and exhaust ducts 11 and 12. After passage through the apparatus the fibrous material passes under the roller 37 as a fine frothy mass of clean fibers of a desired grade to be removed by the aspirator 65.

In addition to its cleaning characteristics, the apparatus may also function to classify the fibrous material into a desired grade. The classification is accomplished by having endless screens of various sizes and mesh. For a particular grade of fiber, an endless screen of predetermined size and mesh are employed. If desired, a plurality of cleaners could be used in succession to properly clean and classify a quantity of fibrous material into a plurality of grades in which each grade would consist of thoroughly cleaned fibers.

During one operation of the apparatus desirable results were produced with the variable elements therein having the following characteristics. Each endless screen was made from 40 x 40 screening. Each of the foam rubber strips 26 and 27 were 1½ inches thick and 2 inches in width and were cemented along both edges to the entire length of the endless screen 17 so that the inner edges of the foam rubber strips were 12 inches apart. The transverse foam rubber strips 28 were 1½ inches thick and one inch in width and were cemented to the belt 17 spaced every 18 inches. The air knives 57 and 62 were triangular in cross section and four inches in height with the base opening being one inch wide and the apex opening 1/32 inch wide. Air pressure to the air knives 57 and 62 was approximately 0.5 p.s.i.g. The blower connected through ducts 11 and 12 was of sufficient capacity to maintain a negative pressure in the housing 10. The endless belts 17 and 35 were moved at the rate of 54 f.p.m. Asbestos fiber of commercial grade 6D20 Canadian Asbestos Classification was fed into compartments 29 from the hopper 30 and the aspirator 65 removed thoroughly cleaned fiber of commercial grade 4D Canadian Asbestos Classification. It is to be understood that the details of the above apparatus are given for illustration purposes only, and it is not intended to limit the invention thereto.

Obviously, many features may be varied to obtain clean and classified fibers of varying degrees. The width and length of the endless screens and also the distance between the adjacent reaches of the endless screens may be varied to obtain a desired product. The speed of the endless screens and the pressure to the air knives may also be varied to obtain a product of the desired quality. As previously mentioned, the size and mesh of the endless screens may also be varied. Many combinations of the above variables may be made to produce clean and classified fibers as desired.

It is to be appreciated that the above description is given for illustration of the preferred embodiment only and it is not intended to limit the invention thereto. It is contemplated that the invention disclosed herein may be advantageously utilized with any type of apparatus wherein the material having unwanted particles intermixed therewith is moved in a predetermined general direction to be progressively subjected to the repeated agitations alternately from opposite directions so that the tumbling, turbulent action resulting therefrom frees the unwanted particles from the material. Thus, it is to be understood that the details, explained above, need not be strictly adhered to and that various changes and modifications may suggest themselves to one skilled in the art, all falling within the scope of the invention as defined by the subjoined claims.

What I claim is:
1. A method for treating material having unwanted particles intermixed therewith and clinging thereto comprising placing said material in a position to be moved, confining said material within a predetermined space during movement thereof, said predetermined space being defined by at least two foraminous walls, subjecting said material to repeated agitations throughout said space to transpose said material from a position contiguous to a section of one of said foraminous walls to another position contiguous to a section of the other of said foraminous walls substantially opposite to said first mentioned position to free said unwanted particles therefrom, removing the freed unwanted particles from said space, and collecting the treated material.

2. A method for treating material having unwanted particles intermixed therewith and clinging thereto comprising placing said material in a position to be moved, confining said material within a predetermined space during movement thereof, said predetermined space being defined by at least two foraminous walls, subjecting said material to repeated pneumatic agitations throughout said space to transpose said material from a position contiguous to a section of one of said foraminous walls to another position contiguous to a section of the other of said foraminous walls substantially opposite to said first mentioned position to free said unwanted particles therefrom, removing the freed unwanted particles from said space, and collecting the treated material.

3. A method for treating fibrous material having unwanted particles intermixed therewith and attached thereto comprising placing said fibrous material in a position to be moved, confining said fibrous material within a predetermined space, said predetermined space being defined by at least two foraminous walls, moving said fibrous material, subjecting said moving fibrous material to repeated agitations throughout said space alternately from opposite directions to transpose said fibrous material from a position contiguous to a section of one of said foraminous walls to another position contiguous to a section of the other of said foraminous walls substantially opposite to said first mentioned position to free said unwanted particles therefrom, removing the freed unwanted particles from said space, and collecting the treated fibrous material.

4. A method for treating fibrous material having unwanted particles intermixed therewith and clinging thereto comprising placing said fibrous material in a position to be moved, confining said fibrous material within a predetermined space, said predetermined space being defined by at least two foraminous walls, moving said fibrous material, subjecting said moving fibrous material to repeated pneumatic agitations throughout said space alternately from opposite directions to transpose said fibrous material from a first position contiguous to a section of one of said foraminous walls to a second position contiguous to a section of the other of said foraminous walls substantially opposite to said first position to free said unwanted particles therefrom, removing the freed unwanted particles from said space, retaining said fibrous material in said second position between said repeated agitations, and collecting the treated fibrous material.

5. An apparatus for treating material having unwanted particles intermixed therewith and clinging thereto comprising a foraminous compartment having at least two foraminous walls, means for depositing a quantity of material into said compartment, said compartment being adapted to confine the material within said compartment, means for moving said compartment, a plurality of pneumatic agitators, said compartment being adapted to be subjected to the action of said agitators during movement thereof, said pneumatic agitators being adapted to act on said material in said compartment alternately from opposite directions during movement of said compartment to transpose said fibrous material from a position contiguous to a section of one of said foraminous walls to another position contiguous to a section of the other of said foraminous walls substantially opposite to said first mentioned position to free said unwanted particles from said material so that the freed unwanted particles will pass through said foraminous compartment, means for removing the freed unwanted particles passing through said foraminous compartment, and means for collecting the treated material.

6. An apparatus for treating material having unwanted particles intermixed therewith and clinging thereto comprising a first screen, a second screen mounted above and adjacent said first screen, said second screen being spaced from said first screen, means for depositing a quantity of material on said first screen, means for moving said material in a predetermined general direction, means for confining said material between said screens during movement thereof, a plurality of pneumatic agitators, said pneumatic agitators being adapted to act on said material during movement of the material in said predetermined general direction from one side of said apparatus to the other side of said apparatus to transpose said fibrous material from a position contiguous to one of said screens to another position contiguous to the other of said screens substantially opposite to said first mentioned position to free said unwanted particles from said material so that the freed unwanted particles will pass through said screens, means for removing the freed unwanted particles passing through said screens, and means for collecting the treated material.

7. An apparatus for treating material having unwanted particles intermixed therewith and clinging thereto comprising a first screen, a second screen mounted above and adjacent said first screen, said second screen being spaced from said first screen, means for depositing a quantity of material on said first screen, means for moving said material in a predetermined general direction, means for confining said material between said screens during movement thereof, a plurality of agitators, said agitators adapted to act on said material alternately from opposite directions during movement of the material in said predetermined general direction from one side of said apparatus to the other side of said apparatus to transpose said fibrous material from a first position contiguous to one of said screens to a second position contiguous to the other of said screens substantially opposite to said first position to free said unwanted particles from said material and to clean said screens so that the freed unwanted particles will pass through said screens, means for removing the freed unwanted particles passing through said screens, means for retaining said fibrous material in said second position between said repeated agitations, and means for collecting the treated material.

8. Apparatus as in claim 7 wherein said plurality of agitators comprises a plurality of first air knives mounted below said first screen, said first air knives being adapted to direct air under pressure through said first screen and against said material and a plurality of second air knives mounted above said second screen, said second air knives being adapted to direct air under pressure through said second screen and against said material.

9. Apparatus for treating material having unwanted particles intermixed therewith and clinging thereto comprising a first endless moving screen having an upper reach, a second endless moving screen having a lower reach, said second endless moving screen being positioned and arranged so that its said lower reach is adjacent and moves in the same direction as the said upper reach of said first endless moving screen, said adjacent reaches being spaced from each other a predetermined distance, means for depositing said material on one end of the upper reach of said first endless moving screen, means for confining said material between said adjacent reaches of said endless screens, a plurality of agitators, said agitators being adapted to act on said material during movement with said endless moving screens to transpose said fibrous material from a first position contiguous to one of said screens to a second position contiguous to the other of said screens substantially opposite to said first position to free said unwanted particles from said material and to clean said endless moving screens so that the freed unwanted particles will pass through said endless moving screens, means for removing the freed unwanted particles passing through said endless moving screens, means for retaining said fibrous material in said second position between said repeeated agitations, and means at the other end of the upper reach of said first endless moving screen for collecting the treated material.

10. Apparatus as in claim 9 wherein said confining means comprises an endless foam rubber strip secured to each edge portion of said first endless moving screen, means for retaining said first endless moving screen generally in a common plane, and means for retaining said second endless moving screen in contiguous relationship with said foam rubber strips.

11. Apparatus for treating material having unwanted particles intermixed therewith and clinging thereto comprising a first endless moving screen, a second endless moving screen, said second endless moving screen being positioned so that the lower reach of said second endless moving screen is adjacent and moves in the same direction as the upper reach of said first endless moving screen, said adjacent reaches being spaced from each other a predetermined distance, means for depositing said material on one end of the upper reach of said first endless moving screen, means for confining said material between said adjacent reaches of said endless screens, a plurality of pneumatic agitators, said pneumatic agitators being adapted to act on said material alternately from opposite directions during movement with said screens to transpose said fibrous material from a position contiguous to one of said screens to another position contiguous to the other of said screens substantially opposite to said first mentioned position to free said unwanted particles from said material and to clean said screens so that the freed unwanted particles will pass through said screens, means for removing said unwanted particles passing through said screen, and means at the other end of the upper reach of said first endless moving screen for collecting the treated material.

12. Apparatus as in claim 11 wherein said plurality of agitators comprises a plurality of first air knives mounted below said upper reach of said first endless moving screen, said first air knives being adapted to direct air under pressure through said first endless moving screen and against said material, a plurality of second air knives mounted above said lower reach of said second endless moving screen, and said second air knives being adapted to direct air through said second endless moving screen and against said material.

13. Apparatus for cleaning and classifying fibrous material having unwanted particles intermixed therewith and clinging thereto comprising a housing, a first endless moving screen adapted for longitudinal movement through said housing, a second endless moving screen adapted for longitudinal movement within said housing, said second endless moving screen being positioned so that the lower reach of said second endless moving screen is adjacent and parallel to but spaced from the upper reach of said first endless moving screen, said adjacent reaches being adapted to move in the same direction, means for separating said space between said adjacent reaches into compartments, means for depositing said fibrous material on one end of said upper reach of said first endless moving screen, means for confining said fibrous material in said compartments between said adjacent reaches of said endless moving screens, a plurality of pneumatic agitators, said pneumatic agitators being adapted to act on said material during movement with said endless moving screens to transpose said fibrous material from a first position contiguous to one of said screens to a second position contiguous to the other of said screens substantially opposite to said first position to free said unwanted particles from said material and to clean said endless moving screens so that the freed unwanted particles will pass through said endless moving screens, said endless moving screens being of a predetermined size and mesh so that only particles less than said size and mesh will pass therethrough, means for retaining said fibrous material in said second position between said repeated agitations, means connected to said housing for removing the freed unwanted particles passing through said endless moving screens, and means at the other end of said first endless moving screen for removing the cleaned and classified fibers.

14. Apparatus for cleaning and classifying fibrous material having unwanted particles intermixed therewith and clinging thereto comprising a housing, a first endless moving screen adapted for longitudinal movement through said housing, a second endless moving screen adapted for longitudinal movement within said housing, said second endless moving screen being positioned so that the lower reach of said second endless moving screen is adjacent and parallel to but spaced from the upper reach of said first endless moving screen, said adjacent reaches being adapted to move in the same direction, means for depositing said fibrous material on one end of said upper reach of said first endless moving screen, means for confining said fibrous material between said adjacent reaches of said endless moving screens, a plurality of pneumatic agitators, said pneumatic agitators being adapted to act on said material alternately from opposite directions during movement with said endless moving screens to transpose said fibrous material from a first position contiguous to one of said screens to a second position contiguous to the other of said screens substantially opposite to said first position to free said unwanted particles from said material and to clean said endless moving screens so that the freed unwanted particles will pass through said endless moving screens, said endless moving screens being of a predetermined size and mesh so that only particles less than said size and mesh will pass therethrough, means communicating with said housing for removing the freed unwanted particles passing through said endless moving screens, means for retaining said fibrous material in said second position between said repeated agitations, and means at the other end of said first endless moving screen for removing the clean and classified fiber.

15. Apparatus as in claim 14 wherein said plurality of pneumatic agitators comprises a plurality of first air knives mounted below said upper reach of said first endless moving screen, said first air knives being adapted to direct air under pressure through said first endless moving screen and against said material, a plurality of second air knives mounted above said lower reach of said second endless moving screen, and said second air knives being adapted to direct air through said second endless moving screen and against said material.

16. Apparatus as in claim 15 wherein said confining means comprises an endless foam rubber strip secured to each edge portion of said first endless moving screen, a plurality of transverse foam rubber strips adapted to join the inner edge portions of said endless foam rubber strips, each of said transverse foam rubber strips being spaced a predetermined distance apart, means for retaining said first endless moving screen generally in a common plane and means for retaining said second endless moving screen in contiguous relationship with said foam rubber strips.

References Cited in the file of this patent

UNITED STATES PATENTS

| | | |
|---|---|---|
| 1,026,432 | Dey | May 14, 1912 |
| 1,510,615 | Walsh | Oct. 7, 1924 |
| 1,932,827 | Morris et al. | Oct. 31, 1933 |
| 1,943,775 | Taylor | Jan. 16, 1934 |
| 2,129,214 | Hopkins | Sept. 6, 1938 |
| 2,257,351 | Silver | Sept. 30, 1941 |
| 2,813,306 | Sheldon | Nov. 19, 1957 |